United States Patent

Sworowski et al.

(10) Patent No.: US 10,363,955 B2
(45) Date of Patent: Jul. 30, 2019

(54) CONTROL DEVICE FOR A STEERING SYSTEM

(71) Applicant: Robert Bosch Automotive Steering GmbH, Schwäbisch Gmünd (DE)

(72) Inventors: Eugen Sworowski, Lorch (DE); Gebhard Hudelmaier, Mögglingen (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/562,553

(22) PCT Filed: Jan. 12, 2016

(86) PCT No.: PCT/EP2016/050408
§ 371 (c)(1),
(2) Date: Sep. 28, 2017

(87) PCT Pub. No.: WO2016/155894
PCT Pub. Date: Oct. 6, 2016

(65) Prior Publication Data
US 2018/0105199 A1 Apr. 19, 2018

(30) Foreign Application Priority Data

Mar. 30, 2015 (DE) .................. 10 2015 104 867

(51) Int. Cl.
*B62D 5/07* (2006.01)
*B62D 5/04* (2006.01)
(Continued)

(52) U.S. Cl.
CPC ........... *B62D 5/0406* (2013.01); *B62D 5/046* (2013.01); *H02K 11/33* (2016.01); *H02P 25/22* (2013.01);
(Continued)

(58) Field of Classification Search
CPC ..... H02P 29/68; H02P 29/0241; B62D 5/003; B62D 5/0463; B62D 5/001; B62D 5/06; B62D 5/07
See application file for complete search history.

(56) References Cited

U.S. PATENT DOCUMENTS 4,387,782 A * 6/1983 Leiber ...................... B62D 5/07
180/421
4,623,031 A * 11/1986 Drutchas .................. B62D 5/06
180/428

(Continued)

FOREIGN PATENT DOCUMENTS

DE 101 14 600 A1 1/2002
DE 102 39 297 A1 10/2003
(Continued)

OTHER PUBLICATIONS

International Search Report corresponding to PCT Application No. PCT/EP2016/050408, dated Mar. 30, 2016 (German and English language document) (6 pages).

*Primary Examiner* — Rina I Duda
(74) *Attorney, Agent, or Firm* — Maginot, Moore & Beck LLP

(57) ABSTRACT

A control device is configured for use in a steering system in a vehicle with electromotive servo assistance. The control device includes control device elements and electronic components for actuating a servo motor arranged in each control device element. The control device has chambers configured to accommodate the electronic components of the control device elements. The chambers are sealed off from one another in a watertight manner at least up to a defined filling level. The electronic components of the control device elements are split over different chambers.

13 Claims, 2 Drawing Sheets

(51) Int. Cl.
- *H02K 11/33* (2016.01)
- *H02P 25/22* (2006.01)
- *H02K 5/10* (2006.01)
- *H02K 3/28* (2006.01)
- *B62D 3/12* (2006.01)

(52) U.S. Cl.
CPC .............. *B62D 3/12* (2013.01); *B62D 5/0421* (2013.01); *H02K 3/28* (2013.01); *H02K 5/10* (2013.01); *H02K 2213/06* (2013.01); *H02K 2213/12* (2013.01)

(56) References Cited

U.S. PATENT DOCUMENTS

| | | | | |
|---|---|---|---|---|
| 6,285,936 | B1* | 9/2001 | Bohner | B62D 5/06 180/422 |
| 2004/0020708 | A1* | 2/2004 | Szabela | B62D 5/001 180/446 |
| 2006/0042858 | A1* | 3/2006 | Boyle | B62D 5/003 180/402 |
| 2009/0223737 | A1* | 9/2009 | Crossman | B62D 5/0463 180/422 |
| 2013/0257232 | A1* | 10/2013 | Tomizawa | H02K 29/08 310/68 R |
| 2014/0298789 | A1* | 10/2014 | Naumann | F16H 61/4043 60/420 |
| 2015/0298728 | A1* | 10/2015 | Yoda | H02K 7/06 180/422 |
| 2016/0094175 | A1* | 3/2016 | Yamasaki | H02P 29/68 318/724 |
| 2016/0111988 | A1* | 4/2016 | Suzuki | H02P 29/0241 180/446 |

FOREIGN PATENT DOCUMENTS

| | | |
|---|---|---|
| DE | 10 2012 101 006 A1 | 8/2013 |
| EP | 2 159 584 A1 | 3/2010 |

* cited by examiner

CONTROL DEVICE FOR A STEERING SYSTEM

This application is a 35 U.S.C. § 371 National Stage Application of PCT/EP2016/050408, filed on Jan. 12, 2016, which claims the benefit of priority to Serial No. DE 10 2015 104 867.1, filed on Mar. 30, 2015 in Germany, the disclosures of which are incorporated herein by reference in their entirety.

The disclosure relates to a control device for a steering system in a vehicle with electromotive servo assistance.

BACKGROUND

Steering systems in vehicles comprising an electric servo motor by means of which a servo moment, which assists the steering movement, is introduced into the steering system are known. The servo motor is actuated by means of a control device, wherein the magnitude of the servo moment is determined from different state variables and parameters of the vehicle and of the steering system, amongst others from the currently acting steering moment.

SUMMARY

In order to allow highly automated driving in which the steering control function is carried out automatically and without driver intervention by means of the servo motor, a very high degree of reliability against malfunctioning of the steering system or a component of the steering system has to be ensured for safety reasons. In particular, it is necessary to preclude the control device malfunctioning due to the ingress of water.

The disclosure is based on the object of designing a control device for a steering system in a vehicle with electromotive servo assistance in a fail-safe manner using simple measures.

This object is achieved according to this disclosure.

The control device according to the disclosure can be used in steering systems in vehicles with electromotive servo assistance. Here, a servo moment which assists the steering movement is generated in the steering system by means of an electric servo motor. In the case of highly automated driving, the steering movement is carried out exclusively and without intervention by the driver by means of actuating the servo motor.

The control device, which is associated with the servo motor, comprises at least two control device elements, of which each control device element is fully equipped with components for actuating a servo motor. The control device is provided with at least two chambers for accommodating electronic components of the control device elements, wherein the chambers are advantageously sealed off from one another in a watertight manner up to a defined filling level of entering water. The different components of the control device elements are split over the different chambers in the control device. If the water level does not reach the defined filling level in one chamber, the second chamber remains free of water. The chambers can possibly also be sealed off from one another in a completely watertight manner.

This embodiment has the advantage that, in the event of ingress of water into one of the chambers, there is the risk of electronic components located in this chamber malfunctioning, but at the same time the electronic components in the adjacent chamber retain their functionality, so that the functionality of at least one control device element can be maintained in spite of the ingress of water. The electric servo motor in the steering system can therefore be actuated by means of the functional control device element. The ingress of water into one of the chambers in the control device therefore does not lead to functional failure of the servo motor-based steering assistance or steering function.

This allows, in particular, use of the control device in steering systems with highly automated driving in the case of which the steering function is carried out by means of actuating the servo motor without action by the driver. Steering systems of this kind require an increased level of security against functional failure, and this can be ensured by the control device according to the disclosure.

Each control device element contains, in particular, a control unit and a power electronics unit in each case, wherein the control unit comprises the control logic system and the power electronics unit performs electrical actuation of the servo motor. In an advantageous embodiment, a control unit and a power electronics unit of one control device element are split over different chambers. According to a further expedient embodiment, the power electronics units of two different control device elements are accommodated in a common chamber, whereas the control units of the two control device elements are split over different chambers. This embodiment has the advantage that the functioning of the servo motor is ensured if water has entered only one of the chambers and the second chamber remains free of water. The functioning is maintained irrespective of which chamber contains water, provided that one chamber does not contain water.

At least two electronic components, which are associated with different control device elements, are advantageously located one above the other in each chamber and therefore are at different distances from the base of the respective chamber. This ensures that, in the event of water entering the chamber, only the electronic components which are adjacent to the base malfunction, whereas the components which are arranged at a relatively large distance from the base maintain their functionality. Owing to this, together with the electronic components of one control device element being split over different chambers, the functionality of a control device element for actuating the servo motor is maintained.

According to an expedient embodiment, the power electronics units of two different control device elements are located in a common chamber and are arranged one above the other—at different distances from the base of the chamber. The control units of the two control device elements are split over different chambers. If, for example, water enters the chamber containing the two power electronics units, only that power electronics unit which is adjacent to the base malfunctions, but not the power electronics unit at a relatively large distance from the base; a control unit in the adjacent chamber is associated with this power electronics unit, the said control unit maintaining its functionality since no water has entered said chamber.

If, however, water enters the second chamber, the control unit of the second control device element is disabled, but the power electronics unit and the control unit of the first control device element which are both located in the other chamber continue to function. It is therefore ensured in each case that the functionality of a control device element is maintained in spite of the ingress of water into one chamber.

According to a further expedient embodiment, all plug connections for the control device elements, by means of which plug connections the control device elements are connected to a data bus and to a sensor system, are located on a first chamber, in particular the outside of the chamber.

The plug connections are arranged, in particular, one above the other and therefore are at different distances from the base.

All motor connection terminals of the control device elements are arranged on the further chamber, in particular on the outside of the chamber, preferably likewise one above the other and therefore at different distances from the base of the chamber. In particular, different motor winding sets of the same servo motor are actuated by means of the motor connection terminals. However, it is also possible to actuate different servo motors, which are arranged in the steering system, by means of the motor connection terminals.

All of the power electronics units are advantageously located in those chambers on which the motor connection terminals are also arranged. However, according to a further expedient embodiment, EMC filter units for all of the control device elements are arranged on the further chamber.

According to a further advantageous embodiment, the electronic components of a control device element are arranged in one chamber at a relatively small distance from the base of said chamber and in the second chamber at a relatively large distance from the base of said chamber. In the same way, this can also apply to the second control device element, of which the components can be arranged in the first chamber at a relatively large distance from the base of said chamber and in the second chamber at a relatively small distance from the base of said chamber. For example, the EMC filter unit and the plug connection of the first control device element are arranged in the first chamber at a relatively large distance from the base and the control unit, the power electronics unit and the motor connection terminal are arranged in the second chamber at a relatively small distance from the base; in the case of the second control device element, the control unit, the EMC filter unit and the plug connection are arranged in the first chamber at a relatively small distance from the base and the power electronics unit and the motor connection terminal are arranged in the second chamber at a relatively large distance from the base.

The watertightness between the chambers is ensured by means of a separating wall which separates the chambers. According to an advantageous embodiment, a line aperture is made in the separating wall in order to be able to connect the different electronic components of a control device element, which electronic components are split over different chambers, to one another via the line aperture. The line aperture is preferably arranged at a distance from the base of the chambers in order to ensure that, in the event of water entering one of the chambers, said water is prevented from passing through the line aperture into the second chamber up to a defined filling level. The bases of the two chambers are preferably located at the same level.

The electric servo motor, which is used in the steering system, preferably has two separate motor winding sets to which current can be applied and which are actuated by means of a control device element in each case. Current is to be applied to the motor winding sets independently of one another by means of a control device element in each case. The servo motor is preferably a permanent-magnet synchronous motor with electronic commutation, in which the permanent magnets are arranged on the rotor shaft and the motor windings are accommodated on the stator side. In each case one motor winding set comprises a plurality of windings to which current can be applied and which are each arranged split over a semicircle of the stator. The motor winding sets both act on the rotor and complement one another to form a complete circle. This also ensures that, in the event of ingress of water into the motor housing, initially only one motor winding set malfunctions, whereas the second motor winding set still maintains its functionality and can be actuated by means of the control device element which is associated with it.

The steering system with which the control device is equipped comprises the servo motor which is preferably equipped in the above-described manner with two motor winding sets for in each case one control device element.

BRIEF DESCRIPTION OF THE DRAWINGS

Further advantages and expedient embodiments can be gathered from the claims, the description of the figures and the drawings, in which:

DETAILED DESCRIPTION

Figure 1:
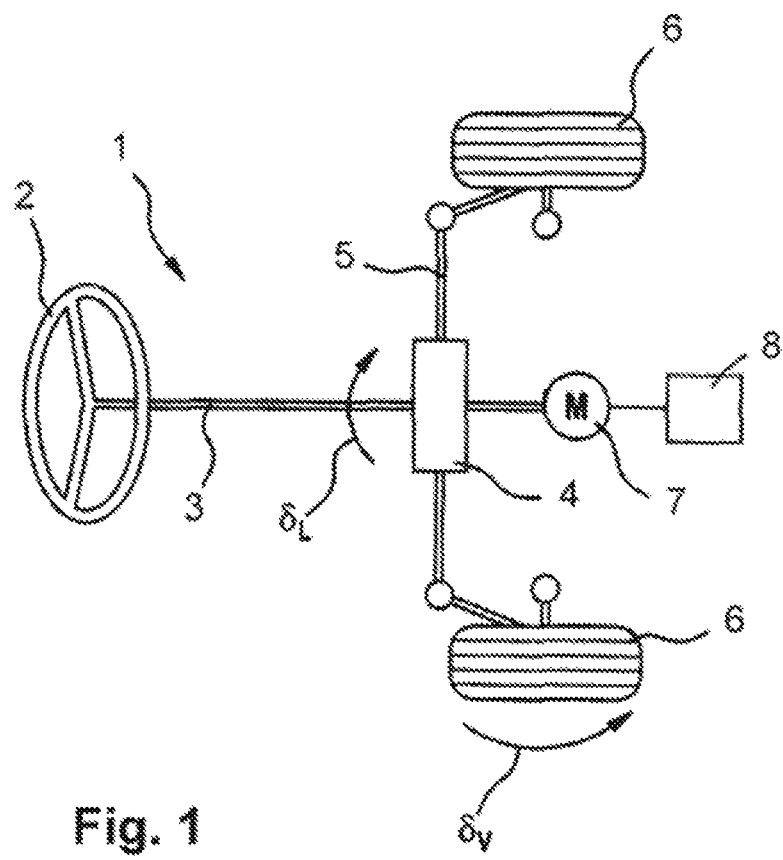
FIG. 1 is a schematic illustration of a steering system in a vehicle.

Identical components are provided with identical reference numerals in the figures.

The steering system 1 illustrated in FIG. 1 comprises a steering wheel 2, a steering spindle or shaft 3, a steering housing 4 having a steering mechanism which is accommodated in said steering housing, and a steering linkage having a steering rack 5 by means of which a steering movement is transmitted to the steerable wheels 6 of the vehicle. The driver prespecifies a steering angle $\delta_L$ by means of the steering wheel 2, to which the steering spindle 3 is fixedly connected, and said steering angle is transmitted in the steering mechanism in the steering housing 4 to the steering rack 5 of the steering linkage, whereupon a wheel steering angle $\delta_V$ is set at the steerable wheels 6.

The steering system 1 comprises an electric servo motor 7 by means of which a servo moment can be fed to the steering mechanism in the steering housing 4 in order to assist the manual moment applied by the driver. The servo motor 7 is actuated by means of a control device 8 which generates control signals depending on input signals detected by sensor, amongst others the steering moment and, for example, the vehicle speed.

For highly automated driving, the servo motor 7 can also be actuated by means of the control device 8 in such a way that the steering movement is generated without intervention by the driver.

The electric servo motor 7 is preferably designed as a permanent-magnet synchronous motor with permanent magnets on the rotor shaft, wherein windings to which current can be applied and to which current is applied by means of the control device are arranged split over the circumference of the stator. Two motor winding sets which are independent of one another and each have a plurality of windings to which current can be applied independently of one another are arranged on the stator side. In each case one motor winding set comprises a plurality of windings to which current can be applied and which are each arranged split over a semicircle of the stator. The motor winding sets complement one another to form a complete circle.

Figure 2:
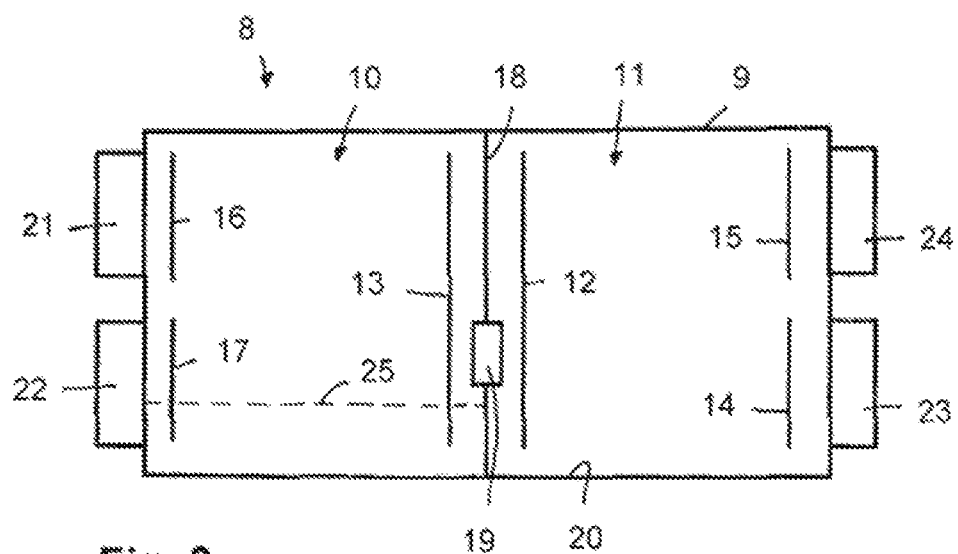
FIG. 2 is a schematic illustration of a control device for the electric servo motor of the steering system, comprising two chambers which are separated by means of a separating wall, wherein electronic components of two control device elements are arranged in the two chambers, wherein the base of one chamber is covered by water.
Figure 3:
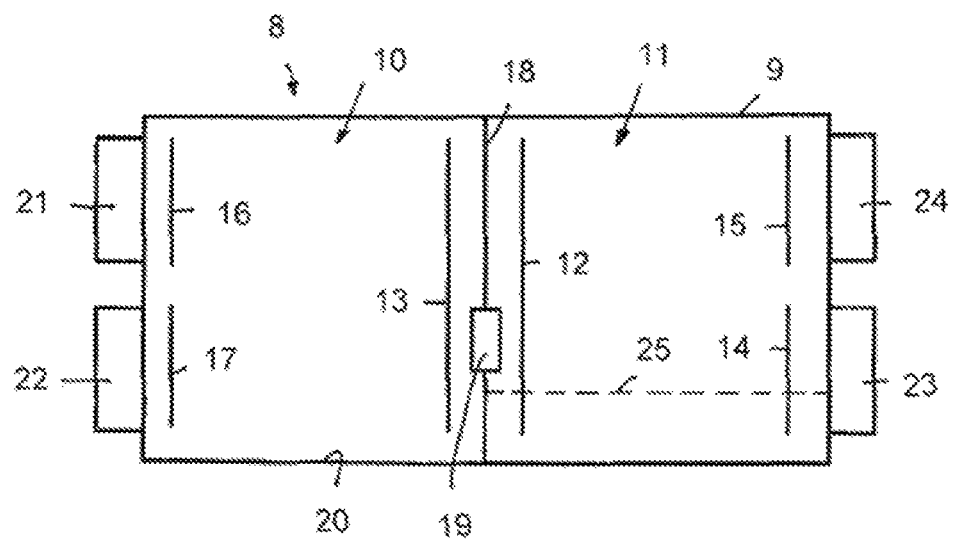
FIG. 3 is an illustration corresponding to FIG. 2, but with water in the second chamber.

FIGS. 2 and 3 each illustrate a control device 8 for applying current to the servo motor. The control device 8 has, in a housing 9, two chambers 10 and 11 in which different electronic components 12 to 17 are accommodated. The two chambers 10 and 11 are separated by means of a separating wall 18 in which a line aperture 19 is made in order to connect electronic components, which are split over different chambers 10, 11, to one another. The line aperture 19 is located at a distance from the base 20 of the chambers 10, 11. The two chambers 10, 11 have a base 20 which is situated at the same height and which can be of flat or curved design.

The electronic components 12 to 17 in the two chambers 10, 11 belong to two control device elements by means of which in each case one motor winding set of the servo motor can be actuated. The control device elements are of identical construction and have the same electronic components. Each control device element comprises a control unit 12 and, respectively, 13 which contains the control logic system, a power electronics system 14 and, respectively, 15 for applying current to a motor winding set of the servo motor, and an EMC filter unit (electromagnetic compatibility) 16 and, respectively, 17. The electronic components of each control device element are split over the two chambers 10 and 11. The control unit 13 of the second control device element and the EMC filter units 16 and 17 of the first and the second control device element are located in the first chamber 10. The control unit 12 of the first control device element and the two power electronics units 14 and 15 of the two control device elements are located in the second chamber 11.

The electronic components are arranged partially one above the other and at different distances from the base 20 of the chambers 10, 11. For example, the two EMC filter units 16 and 17 in the first chamber 10 are situated one above the other at different distances, wherein the EMC filter unit 16 of the first control device element is arranged at a greater distance from the base 20 than the EMC filter unit 17 of the second control device element. In the chamber 11, the power electronics unit 14 of the first control device element is situated closer to the base 20 than the second power electronics unit 15 of the second control device element.

Plug connections 21 and 22, which are arranged one above the other, are located on the outside of the first chamber 10, wherein the plug connection 21 is associated with the first control device element and the plug connection 22 is associated with the second control device element. The control device 8 is linked to data buses or the sensor system in the vehicle or in the steering system and to the power supplies by means of the plug connections 21 and 22.

Motor connection terminals 23 and 24 which are associated with the first and, respectively, second control device element are located on the outside of the second chamber 11. The first motor connection terminal 23 of the first control device element is situated closer to the base 20 and is mounted directly in front of the first power electronics unit 14. The second motor connection terminal 24 for the second control device element is at a relatively large distance from the base 20 and is mounted directly in front of the second power electronics unit 15. The electrical connection to the two motor winding sets of the servo motor is made by means of the motor connection terminals 23, 24.

FIG. 2 illustrates ingress of water into the first chamber 10 with a water level or a filling level 25. The water level 25 is high enough that the second control unit 13 and the second EMC filter unit 17 enter the water, so that functional failure of these components has to be expected. However, since the second chamber 11 is free of water at the same time, the functioning of the electronic components which are contained in the second chamber is still ensured. In addition, the first EMC filter unit 16 does not detect the water level 25 in the first chamber 10. Therefore, all of the electronic components of the first control device element with the control unit 12, the power electronics unit 14 and the EMC filter unit 16 remain functional, so that the associated motor winding set in the servo motor can be actuated by means of these components.

FIG. 3 illustrates the control device 8 with ingress of water into the second chamber 11. As in the exemplary embodiment according to FIG. 2, the water level 25 is below the line aperture 19, so that the other chamber remains free of water. However, the water level 25 in the second chamber 11 is high enough that both the first control unit 12 and the first power electronics unit 14 come into contact with the water, so that the functioning of these electronic components which are associated with the first control device element is not ensured. However, at the same time, all of the electronic components of the second control device element are free of contact with water and are therefore functional, specifically the control unit 13, the power electronics unit 15 and the EMC filter unit 17. Therefore, the associated motor winding set of the servo motor can be actuated by means of these components.

LIST OF REFERENCE SYMBOLS

1 Steering system
2 Steering wheel
3 Steering shaft
4 Steering housing
5 Steering rack
6 Front wheel
7 Electric servo motor
8 Control device
9 Housing
10 Chamber
11 Chamber
12 Control unit I
13 Control unit II
14 Power electronics unit I
15 Power electronics unit II
16 EMC filter unit I
17 EMC filter unit II
18 Separating wall
19 Line aperture
20 Base
21 Plug connection I
22 Plug connection II
23 Motor connection terminal I
24 Motor connection terminal II
25 Water level

The invention claimed is:

1. A control device for a steering system in a vehicle with electromotive servo assistance, the control device comprising:
 a body that includes at least two chambers and a predefined filling level, the at least two chambers sealed off from each other in a watertight fashion at least up to the predefined filling level; and
 at least two sets of electronic components configured to actuate a servo motor, wherein:
  each set is distributed over the at least two chambers; and
  the electronic components in each set form a respective control device element.

2. The control device as claimed in claim 1, wherein:
each set includes a control unit and a power electronics unit; and
the control unit and power electronics unit of at least one set are positioned in different chambers of the at least two chambers.

3. The control device as claimed in claim 2, wherein:
the power electronics units of at least two control device elements are received in a common chamber of the at least two chambers; and
the control units of at least two control device elements are distributed over different chambers of the at least two chambers.

4. The control device as claimed in claim 1, further comprising:
a respective plug connection associated with each control device element, wherein all of the plug connections for the control device elements are positioned in a first chamber of the at least two chambers; and
two motor connection terminals associated with the servo motor, wherein all of the motor connection terminals are positioned in a further chamber of the at least two chambers.

5. The control device as claimed in claim 4, wherein the plug connections and the motor connection terminals are each arranged one above the other.

6. The control device as claimed in claim 4, wherein:
each set includes a control unit and a power electronics unit; and
the power electronics units are positioned in the further chamber of the at least two chambers.

7. The control device as claimed in claim 4, wherein each set further includes an EMC filter unit positioned in the first chamber of the at least two chambers.

8. The control device as claimed in claim 1, further comprising:
a separating wall positioned between adjacent chambers of the at least two chambers, the separating wall including a line aperture positioned at a distance from a base of the chambers.

9. The control device as claimed in claim 1, wherein the sets are positioned within the at least two chambers so that each set is at a different distance from a base of the chambers.

10. The control device as claimed in claim 1, wherein the electronic components of a set associated with a control device element are positioned at different distances from a base of the chambers in different chambers, such that electronic components of the set are at a relatively small distance from the base in a first chamber, and are at a relatively large distance from the base in a further chamber.

11. The control device as claimed in claim 1, wherein each set includes a control unit, a power electronics unit, an EMC filter unit, a plug connection and a motor connection terminal.

12. The steering system as claimed in claim 1, wherein the servo motor in the steering system is actuatable via the control device elements and is configured to receive current.

13. A method for operating a steering system with an electric servo motor and a control device, the method comprising:
actuating a servo motor via at least one control device element to perform automated steering, the at least one control device element formed from one of at least two sets of electronic components configured to actuate the servo motor, each of the at least two sets distributed over at least two chambers of a body of the control device, the at least two chambers sealed off from each other in a watertight fashion at least up to a predetermined filling level of the body of the control device.

* * * * *